Figure 1:
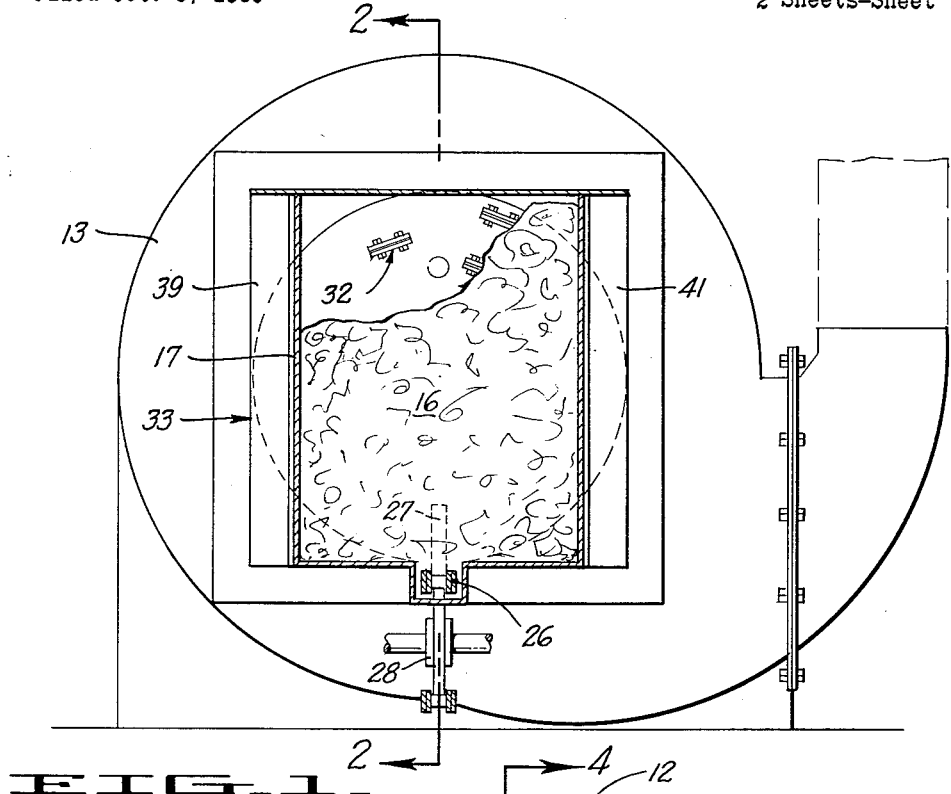

May 22, 1962     H. L. BURCHAM     3,035,621
ROTARY FEED MILLS

Filed Oct. 5, 1959     2 Sheets-Sheet 1

INVENTOR.
Harry L. Burcham
BY
Schapp & Hatch
ATTORNEYS

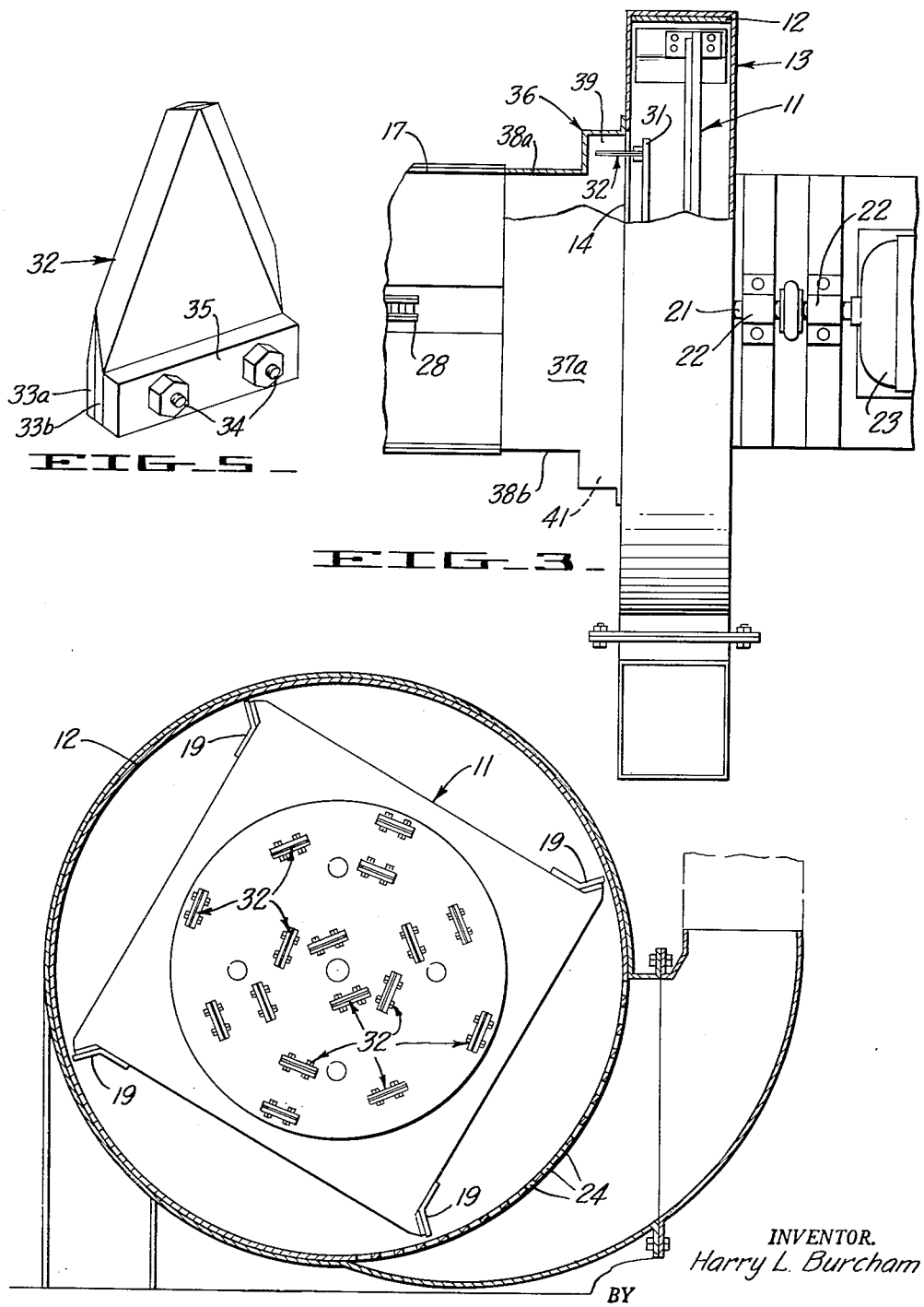

United States Patent Office 3,035,621
Patented May 22, 1962

---

3,035,621
ROTARY FEED MILLS
Harry L. Burcham, Manteca, Calif., assignor to Miller Manufacturing Company, Modesto, Calif., a corporation of California
Filed Oct. 5, 1959, Ser. No. 844,306
12 Claims. (Cl. 146—107)

This invention relates to improvements in rotary feed mills, and more particularly to feed mills designed to chop up and pulverize animal feed such as baled alfalfa and the like.

Previous feed mills, as exemplified in Patent No. 2,248,640, to Irven T. Miller, utilize a rotor member revolving in a cylindrical drum to pulverize the feed, the pulverizing action being effected by the cooperation of whirling paddles mounted on the rotor and perforations formed in the drum.

To tear apart the tightly compressed bale of hay, the prior machine utilized a bale buster plate which revolved with the rotor and was equipped with several finger-like studs, interspersed with triangular knives, in position to rotate against the end of the bale as it entered the drum.

This arrangement of fingers and knives tears clumps of hay from the end of the bale, and these clumps tend to accumulate in a wadded mass. To avoid stoppage of the machine by the clumps, it has been necessary to feed the bales more slowly than the maximum capacity of the mill were clumping not present.

The rotary feed mill of the present invention embodies a bale buster which eliminates clumping by cutting the individual strands of hay to a suitable length for pulverizing. This is accomplished by mounting cutting knives in such manner that they score a series of concentric rings of equal width in the face of the bale. The air currents created by the whirling rotor then smoothly entrain the loosened pre-chopped strands of hay and carry them into the beaters in a continuous stream.

Tearing off of clumps was particularly likely to occur at the corners of the bale where past buster plates did not reach. The present mill reaches these corners and pre-chops them without unduly increasing the size of the drum, rotor, etc., through the use of a novel table head construction.

The bale buster plate mounting also incorporates a novel shock absorbing and self adjusting action which further smooths out the stream of chopped hay into the beater paddles and prevents bunching, even if the bale is fed into the drum too rapidly or at an uneven speed.

It is, therefore, a principal object of the present invention to provide a rotary feed mill which achieves a maximum capacity for a given size and power through even feeding of the baled hay into the mill.

Another object of the invention is to provide a rotary feed mill which will pre-chop baled hay or the like to a desired length in order to prevent wadding of clumps of hay and consequent slowing of the pulverizing operation.

A further object of the invention is to provide a bale buster plate adapted to cut a plurality of concentric grooves into the face of a bale of hay so as to define concentric rings of uniform thickness.

A still further object of the present invention is to provide a rotary feed mill bale buster plate of sturdy and long-wearing construction and having a shock absorbing and self adjusting action for adapting the mill to variations in speed, texture and density of the bale, and foreign materials which may be encountered.

Yet another object of the invention is the provision, in a rotary mill of the character described, of a novel table head construction which accommodates a bale buster large enough to accomplish smooth, wad-free feeding of the hay to the paddles while preserving desired air flow characteristics.

Another object of the invention is to provide a cutting means assembly for a feed mill of the character described in which blades are mounted to function as a unit while providing flexibility and mutual reinforcement under severe operating conditions.

It is still a further object of the present invention to provide a rotary feed mill of the character described which has an improved positioning of the beater blades and cooperating perforations in the drum, and in which the housing is formed to provide maximum flow of the air and entrained pulverized feed into the delivery duct.

Further objects and advantages of my invention will be apparent as the specification proceeds, and the new and useful features of the same will be fully defined in the claims hereto attached.

Figure 2:
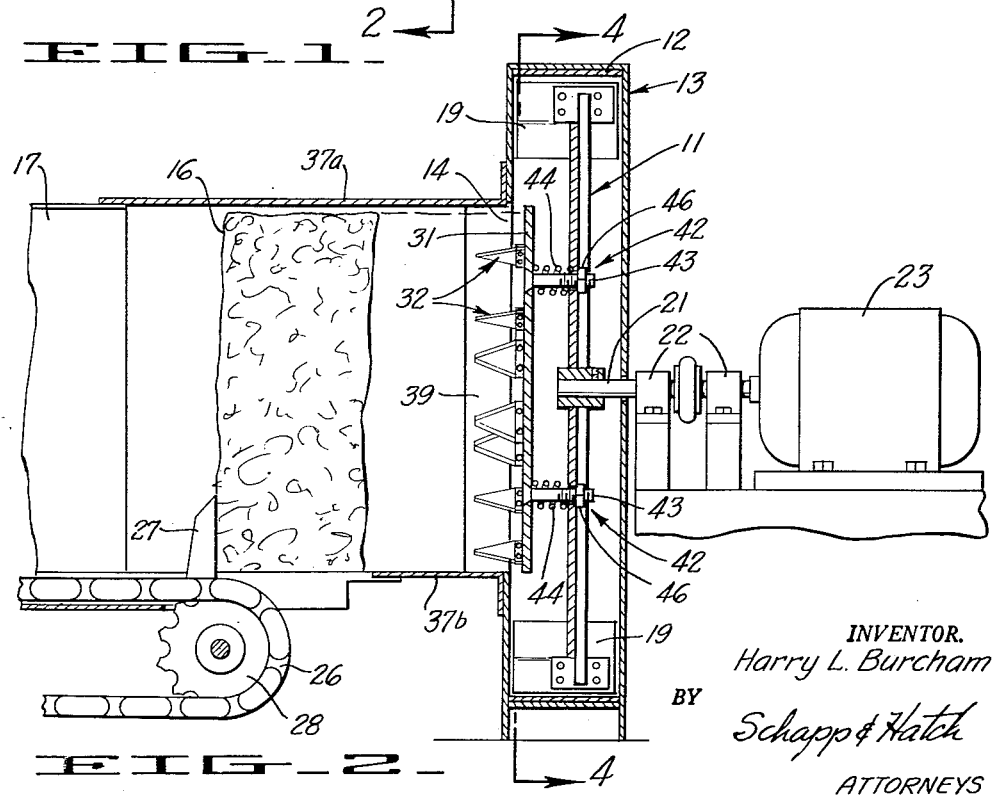

The preferred form of my invention is illustrated in the accompanying drawings, forming part of this application, in which:

FIGURE 1 shows a front elevational view of a rotary feed mill constructed in accordance with the present invention, and showing a feed trough in section;

FIGURE 2, a vertical cross-sectional view taken substantially on the plane of line 2—2 of FIGURE 1;

FIGURE 3, a plan view, partially in section;

FIGURE 4, a vertical section taken substantially on the plane of line 4—4 of FIGURE 2; and FIGURE 5, an enlarged detail of a cutting means.

While I have shown only the preferred form of my invention, it should be understood that various changes or modifications may be made within the scope of the claims hereto appended, without departing from the spirit of the invention.

Referring to the drawings in detail, the rotary feed mill of the present invention consists essentially of a rotor 11 mounted for rotation in a drum 12 which is mounted in a housing 13 having an open face 14 for receiving a bale 16 of hay or the like from a feed trough 17.

The rotor 11 is here shown as comprising a square plate reinforced by diagonal members and having beater paddles 19 mounted at its corners. The rotor 11 is carried for rotation on a shaft 21 supported in bearings 22 and driven by an electric motor 23.

The drum 12 comprises a short cylinder encircling the rotor in close proximity to the circular path of the beater paddles. As the feed is loosened from the bale, it is carried radially outward by the air currents created by the whirling paddles 19. The paddles cooperate with perforations 24 in the drum to chop up and pulverize the strands of hay, etc., which then pass through the perforations.

As a feature of the invention, the perforations 24 are formed in the drum 12 only in the quadrant through which the beater paddles rise as they leave their bottom-most position. Radial and gravitational forces cooperate at this location to produce a better chopping action than is achieved by the older top-discharge mills. The coarseness of the milled feed is determined by the size of the perforations.

The housing 13 sweeps smoothly from the perforated portion of the drum 12 for connection to an upright duct leading to mixing and loading stations (not shown).

Feeding of the bales 16 to the mill through the trough 17 is accomplished by a chain 26 disposed in the bottom of the trough and having upstanding fingers 27 adapted to engage and push against the end of the bale. This chain may be driven through a sprocket 28 by a variable speed motor (not shown) so that the rate of feed can be adjusted for different types of feed.

In accordance with the present invention, the rotor 11 supports a bale buster plate 31 for rotation therewith and in position to engage the end of the bale 16 as it is advanced into the drum 12. Mounted on the plate 31 are a plurality of cutting means 32 projecting toward the trough 17.

Each of the cutting means provides an elongated tapered cutting edge extending on an angle away from the forward face of the plate 31, the cutting edge being disposed in a plane normal to a radius passing through the cutting means from the axis of rotation of the plate.

The preferred structure of the cutting means 32 may best be seen in FIGURE 5 of the drawings. As here shown, a pair of generally triangular blades 33a and 33b are mounted by means of bolts 34 in aligned face to face relation on a boss 35, which is secured to the plate 31 as by welding. The blades, boss and bolts should be made of highly abrasion resistant metal such as hardened steel.

Each blade is tapered to a sharp edge along two sides, and these sharp edges register to provide a single edge tapered in both directions. With this construction, each blade acts as a reinforcement for the other and the laminated effect allows for more shock-absorbing flexure of the blades than would be provided by a single blade of their combined thickness. The sharpened edges at both sides of the cutting means permits revolution of the plate 31 in either direction.

As an important feature of the present invention, the cutting means 32 are arranged to inscribe concentric grooves in the face of the bale 16 so as to pre-chop the strands of hay and prevent wadding and bunching. The cutting means are therefore spaced at different distances from the axis of rotation of plate 31 on even increments of radial distance so that the concentric grooves are evenly spaced. A spacing of approximately two inches between adjacent grooves has been found satisfactory for pre-chopping most hay and grass feeds.

Because of the high speed at which the rotor 11 and plate 31 revolve, it is necessary that the cutting means 32 have a dynamically balanced action. As shown in FIGURE 4, the cutting means are positioned in diametrical lines passing through the axis, with each cutting means on one side of the axis being balanced by a similar cutting means on the same diametrical line on the opposite side of plate 31 and at a similar distance from the axis.

It has been found that the diametrical lines upon which the cutting means 32 are positioned should be positioned at even intervals of rotation around the plate 31. Good results may be obtained with a 45° spacing of the diametrical lines in the manner shown in FIGURE 4.

A more efficient cutting action may be obtained if more than one cutting means 32 is disposed in each groove in the bale end. The drawings illustrate two cutting means in each groove and four cutting means in the outermost groove. In order to preserve the dynamic balance, the cutting means are paired and mounted across from each other. Of course, it will be apparent that more than two cutting means could be used in each groove so long as they are evenly spaced therearound.

Baled hay is commonly rectangular in cross-section, that is, in the position shown in the drawings it is higher than it is wide. The trough 17 is of corresponding dimensions. But, in order to cut grooves across the corners of the bale so as to prevent clumping thereat, it is necessary to make the plate 31 with a diameter equal approximately to the height of the bale. This creates a problem, where as here, the cutting means project through the housing opening 14. Space must be provided for the outermost cutting means, while not interfering with the air-flow characteristics of the rectangular, bale-sized opening.

The problem is solved in the present invention by the provision of a novel table head 36 connecting the end of the trough 17 to the housing 12. The table head 36 has top and bottom walls 37a and 37b and side walls 38a and 38b spaced apart by a distance slightly greater than the height and width respectively of the bale 16. The side walls 38a and 38b are aligned at their outer ends with the walls of trough 17 and are formed with laterally extending recesses 39 and 41 at their juncture with housing 12. These recesses are large enough to accommodate the outermost cutting means 32 but do not interfere with the air-flow characteristics through opening 14.

As a novel feature of the invention, the bale buster plate 31 is resiliently supported on the rotor 11 in such a manner that shocks occasioned by too fast feeding in of the bales, changes in the texture of the bales, other material in the bales, and the like, will be absorbed, thus cutting down on breakage from such causes.

The resilient mountings 42 permit the plate 31 to be forced axially away from the trough. The incline of the cutting edges on the cutting means 32 tend to urge the plate in this direction when they strike an object which they cannot readily cut. The shock energy is taken up by the resiliency of the mountings, thus creating a shock-absorbing action.

As here shown, the resilient mountings 42 consist of a plurality of studs 43 projecting axially from the rear face of plate 31 through openings in the rotor 11. Compression springs 44 are interposed between the plates and urge the plate 31 forwardly as far as it is permitted by a nut 46 threadably engaged on each stud.

The milling capacity of the present mill is determined by the amount of feed which passes into the beaters 19, and this is determined by the air flow which carries the pre-chopped hay to the beater paddles. This air flow is here regulated by the amount of space between the plate 31 and the edges of opening 14.

To cut down the air flow, and hence the capacity of the mill, the plate 31 must be moved closer to the front wall of the housing. This is here accomplished by turning the nuts 46 on the studs 43, since these nuts determine the limits to which the springs 44 will urge the plate 31.

I claim:

1. In a rotary feed mill, a rotatable bale buster plate, and a plurality of cutting means secured to and projecting from one face of said plate, each of said cutting means having an elongated tapered cutting edge extending away from said forward face of the front plate and disposed in a plane substantially normal to a radius passing therethrough from the axis of rotation of said plate, said cutting means being spaced at different distances from said axis and with each cutting means being balanced by a similar cutting means positioned diametrically across the plate at the same distance from said axis, the cutting means being positioned on a plurality of diametrical lines equally spaced circumferentially of the plate.

2. A bale buster plate as described in claim 1 and wherein spaced pairs of said cutting means are positioned on said diametrical lines on each side of said axis.

3. A bale buster plate as described in claim 2 and wherein said diametrical lines are positioned at 45° intervals of rotation around said axis.

4. In a rotary feed mill, a housing having an opening formed in a front wall for receiving the end of a bale of feed to be milled, a bale buster plate mounted for rotation in a substantially vertical plane at said opening, a plurality of cutting means secured to and projecting from said plate and through said opening, a bale delivery trough aligned with said opening, said trough being narrower than the maximum side to side spacing of said cutting means, and a table head joining said trough and housing and formed to enclose an area contiguous to the housing and dimensioned to accommodate the outermost of said cutting means projecting through said opening.

5. In a rotary feed mill, a housing having an opening formed in a front wall for receiving the end of a bale of feed to be milled, a bale buster plate mounted for rotation in a substantially vertical plane at said opening, a plurality of cutting means secured to and projecting from said plate and through said opening, each of said cutting means having an elongated tapered cutting edge extending away from said forward face of the front plate and disposed in a plane substantially normal to a radius passing therethrough from the axis of rotation of said plate, said cutting means being spaced at different distances from said axis and with each cutting means being balanced by a similar cutting means positioned diametrically across the plate and at the same distance from said axis, a bale delivery trough aligned with said opening, said trough being narrower than the maximum side to said spacing of said cutting means, and a table head joining said trough and housing and dimensioned to accommodate the outermost of said cutting means projecting through said opening.

6. In a rotary feed mill, a housing having an opening formed in a front wall for receiving the end of a bale of feed to be milled, a bale buster plate mounted for rotation in a substantially vertical plane at said opening, a plurality of cutting means secured to and projecting from said plate and through said opening, a bale delivery trough aligned with said opening, said trough being narrower than the maximum side to side spacing of said cutting means, and a table head having top and bottom and spaced side walls and formed to provide an extension of said housing at said opening, the side and bottom walls being aligned with said bale trough, and said side walls being formed with laterally extending recesses at said opening dimensioned to provide clearance for the outermost of said cutting means.

7. In a rotary feed mill, a rotatable bale buster plate, and a plurality of cutting means secured to and projecting from one face of said plate for cutting engagement with the end of a bale to be milled, each of said cutting means comprising a pair of generally triangular cutting blades having a beveled cutting edge and secured in registering and contacting back to back relation on said plate to provide an inclined cutting edge extending from said plate, the blades being positioned to lie in a plane normal to a radius passing therethrough from the axis of rotation of said plate.

8. A cutting means for a rotary feed mill, comprising a rotatable bale buster plate a pair of generally triangular cutting blades having a beveled cutting edge and secured upon the plate in registering and contacting back to back relation whereby a single double-beveled cutting edge will be presented and the paired blades will provide resilient support for each other.

9. In a rotary feed mill, a cylindrical housing having a closed end and an opposite end formed with an opening for receiving a bale of feed to be milled, a rotor mounted for rotation in said housing, a bale buster plate resiliently mounted on said rotor for rotation therewith and in a substantially vertical plane at said opening, a plurality of cutting means secured to and projecting from said plate and through said opening, and a plurality of beaters on said rotor adjacent to the inner periphery of said housing, a portion of said housing having sized openings for discharging the milled feed therefrom.

10. In a rotary feed mill, a cylindrical housing having a closed end and an opposite end formed with an opening for receiving a bale of feed to be milled, a rotor mounted for rotation in said housing, a bale buster plate resiliently mounted on said rotor for rotation therewith in a substantially vertical plane at said opening, a plurality of cutting means secured to and projecting from said plate and through said opening, a bale delivery trough aligned with said opening, said trough being narrower than the maximum side to side spacing of said cutting means, a table head joining said trough and housing and formed to enclose an area contiguous to the housing and dimensioned to accommodate the outermost of said cutting means projecting through said opening, and a plurality of beaters on said rotor adjacent to the periphery of said housing, a portion of said housing having openings for discharging the milled feed therefrom.

11. In a rotary feed mill, a cylindrical housing having a closed end and an opposite end formed with an opening for receiving a bale of feed to be milled, a rotor mounted for rotation in said housing, a bale buster plate in said housing in parallel relation to said rotor, a plurality of studs extending from said plate and through said rotor, spring means on said studs urging said plate and rotor apart, nuts adjustably threaded on said studs and bearing against the side of said rotor remote from said plate for adjusting the spacing between said rotor and plate, a plurality of cutting means on said plate projecting through said opening, and a plurality of beaters on said rotor adjacent to the inner periphery of said housing, a portion of said housing having desired sized openings for discharging the milled feed therefrom.

12. A rotary feed mill as described in claim 11 and wherein said openings are located in the quadrant of said housing past which said beaters sweep as they progress from their lowermost position.

References Cited in the file of this patent

UNITED STATES PATENTS

| | | |
|---|---|---|
| 390,998 | Tunstill | Oct. 9, 1888 |
| 1,029,998 | Joplin | June 13, 1912 |
| 1,934,180 | Fischer | Nov. 7, 1933 |
| 1,945,054 | MacGregor | Jan. 30, 1934 |
| 2,679,873 | Hill | June 1, 1954 |
| 2,861,748 | Miller | Nov. 25, 1958 |
| 2,869,601 | Krotz | Jan. 20, 1959 |
| 2,873,779 | Eykamp | Feb. 17, 1959 |